United States Patent [19]

Mollenhoff

[11] Patent Number: 4,704,954
[45] Date of Patent: Nov. 10, 1987

[54] DRIP COFFEE MAKER

[76] Inventor: David V. Mollenhoff, 1501 Morrison St., Madison, Wis. 53703

[21] Appl. No.: 928,968

[22] Filed: Nov. 10, 1986

[51] Int. Cl.⁴ .......................................... A47J 31/057
[52] U.S. Cl. ...................................... 99/279; 99/285; 99/295; 99/307; D7/309
[58] Field of Search ................. 99/279, 295, 280, 281, 99/283, 284, 285, 288, 290, 295, 300, 304, 307, 316; D7/305, 309, 310, 400

[56] References Cited

U.S. PATENT DOCUMENTS

| 4,382,402 | 8/1981 | Alvarez | 99/295 |
| 4,417,504 | 4/1981 | Yamamoto | 99/306 |
| 4,495,404 | 9/1982 | Carmichael | 99/284 |
| 4,506,597 | 10/1983 | Karns et al. | 99/295 |
| 4,662,271 | 5/1987 | Woltermann | 99/295 X |

FOREIGN PATENT DOCUMENTS 0150693  8/1985  European Pat. Off. ............. 99/288

OTHER PUBLICATIONS

Advertisement—Franzus Travel-Lite (TM) Hot Beverage/Coffee Kit.
Advertisement—Bellhop 2 (The Maxim Company).
Advertisement—Norelco Hot Stuff Food/Beverage Maker.
Advertisement—Quick Cafe 5.
Advertisement—Melitta Travelmate.
Advertisement—Nesco "Traveler" Coffeemaker.
Advertisement—Regal Ware "Polyperk" Travel Kit.
Advertisement—Mr. Coffee, Jr.
Advertisement—Krups "Brewmaster"series.
Advertisement—Hamilton Beach Drip Coffee Makers.
Advertisement—Braun Aromaster 12.
Advertisement—"Cup-at-a-Time (TM)" Drip Coffeemaker.
Advertisement—Philips Cafe Compact (TM) Coffee Maker.
Advertisement—Sanyo "Cafe San Jr." (TM) Personal Coffee Maker.
Advertisement—Sunbeam Flavor-Lock Coffeemakers.
Advertisement—Regal Drip Coffee Makers.
Advertisement—Oster "Thermo-Cafe" Coffeemakers.

Primary Examiner—Stuart S. Levy
Assistant Examiner—Katherine Matecki
Attorney, Agent, or Firm—Isaksen, Lathrop, Esch, Hart & Clark

[57] ABSTRACT

A compact self-contained compact hot beverage or drip coffee maker is provided which includes a base unit suitable to contain water for heating and a water heating unit. In the travel or storage mode, a hot beverage holder, a beverage mix storage container, at least one beverage drinking cup, and a beverage filter basket/filler assembly are internested in the base unit in order to provide a compact unit suitable for storage in a travel bag. In the brew mode, the coffee maker kit provides gourmet quality drip coffee.

27 Claims, 11 Drawing Figures

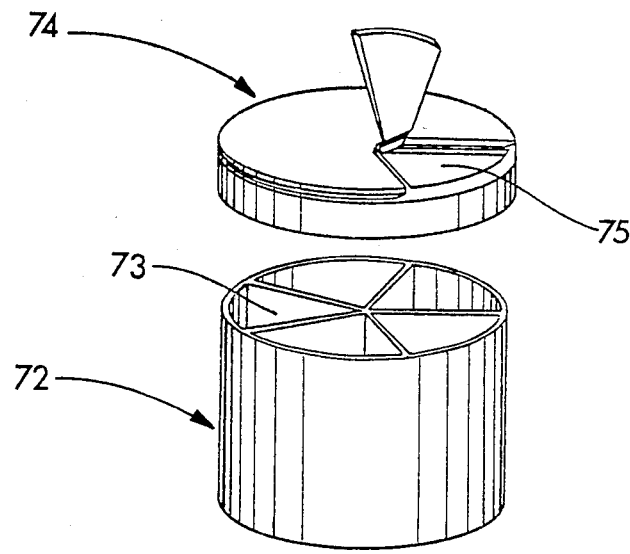
FIG. 8
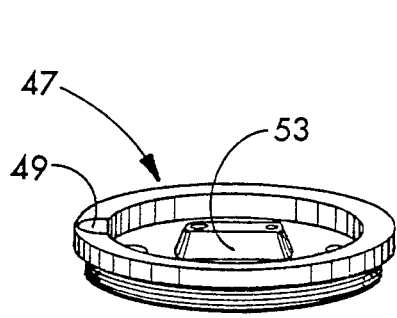
FIG. 9
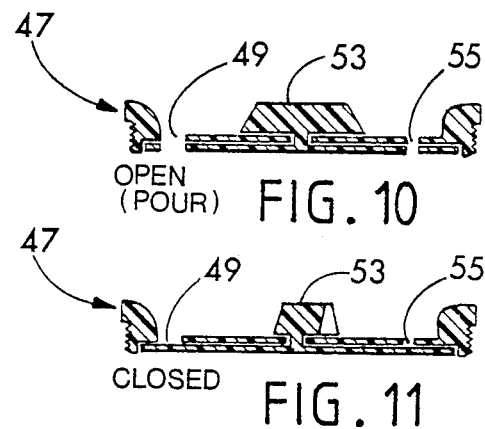
OPEN (POUR) FIG. 10
CLOSED FIG. 11

DRIP COFFEE MAKER

BACKGROUND OF THE INVENTION

1. Field of the Invention

The present invention is directed to a device for making a hot beverage, and particularly to a compact, self-contained drip-filter coffee maker.

2. Description of Related Art

Prior to 1972, nearly all electric coffee makers sold in the United States were of the percolator variety. The only viable alternative for non-commercial coffee makers was instant or powdered coffee which could be made by mixing the powder with hot water. In 1972, the drip-filter method of brewing coffee began to gain in popularity. By 1974, drip-filter machines were outselling percolator coffee makers by a three-to-one margin. Today, the drip-filter coffee brewer remains the preferred method for brewing coffee.

Few coffee makers have been specifically designed for use by a traveler or one desiring a compact coffee maker constructed in a manner to quickly and efficiently brew a small quantity of high quality coffee. Accordingly, there is a need for a compact coffee maker which is simple to operate and does not sacrifice the quality of the coffee drink.

Examples of various forms of compact or portable coffee makers are disclosed in U.S. Pat. Nos. 4,506,597, 4,495,404, and 4,382,402. However, these coffee makers lack one or more of the qualities necessary to provide a small quantity of coffee quickly and efficiently without sacrificing the quality of the taste of the coffee.

OBJECTS OF THE INVENTION

It is thus a primary object of the present invention to provide a coffee making kit.

It is additionally an object of the present invention to provide a portable coffee making kit of extremely compact design for use by a traveler without occupying excess room in the luggage.

It is also an object of the present invention to provide a portable coffee making kit capable of automatically making more than one cup of coffee at a time.

It is also an object of the present invention to provide a fixed base coffee making kit which uses relatively little counter top space.

It is further an object of the invention to provide a coffee making kit which is simole in construction, easy to use, attractive, affordable, long-lasting and trouble-free in operation.

It is further an object of the present invention to provide a portable coffee maker supplied with means to quickly heat water for efficient coffee brewing.

It is further an object of the present invention to provide a device having a compact design which is capable of making hot beverages other than coffee, such as tea, hot chocolate and apple cider mix, and hot water based foods such as instant soups.

These and other objects of the present invention, which will become apparent from the description to follow, are accomplished by the means hereinafter described and claimed.

SUMMARY OF THE INVENTION

The present invention is directed to a self-contained hot beverage or drip coffee maker kit comprising a base unit which, in the brewing mode, receives water for heating. The base unit includes an open top end, a closed bottom end, an interior and an exterior wall. The bottom end of the base unit contains the water heating unit. The base unit further includes a channel or conduit located between the interior wall and the exterior wall for directing heated water toward an outlet in the open part or mouth of the base portion. The kit further comprises a hot beverage holder or carafe removably internested within the base unit. The function of the beverage holder is to receive the coffee during the brewing process or to receive hot water for tea or other hot beverages or water-based foods. The kit includes a filter basket and a filter basket holder. The filter basket provides a receptacle for the filter and the coffee grounds. The filter basket holder precisely positions the basket for both travel and brewing modes. The portable version of the kit includes a container for coffee, tea, beverage mixes, etc., and at least one drinking cup.

The portable coffee maker can also include a coaster attached to the bottom of the base portion which moves out from the base portion to provide a nest for the carafe when the coffee maker is in brewing position.

BRIEF DESCRIPTION OF THE DRAWINGS

FIG. 8 is a perspective view of the beverage mix container and cover of the present invention.

FIG. 9 is a perspective view of the carafe lid of the present invention.

FIGS. 10 and 11 are cross-sectional views of the carafe lid of the present invention in the open and closed position respectively.

DETAILED DESCRIPTION OF THE INVENTION

Although the coffee maker kit of the present invention is useful for producing hot beverages, which includes tea, hot cocoa, soup, cider, etc., it is primarily designed to make gourmet quality coffee. Prior experience has shown that the overwhelming preference for quality coffee is a drip-filter coffee maker. Filters allow flavor-rich coffee oils to pass into the brewed coffee and, at the same time, the filters trap tiny particles thus producing a better tasting coffee without any sediment.

For the purposes of the present invention, it is preferred that kit 10 be made of flavor- and aroma-neutral plastic or a flavor- and aroma-neutral metal or a combination of both.

Of great importance, especially for portable or travel kits, is its compact size. To properly serve the travel needs of the user, the coffee maker must be able to fit easily into suitcases, carry on luggage and brief cases. It must be relatively light weight and contain enough space within its compact configuration to accommodate a beverage mix such as, for example, ground coffee, powdered cream and sugar, for a reasonable length of time, i.e., five days. Further still, from the travel and the fixed base, i.e., permanent or counter top, mode it is desirable that the coffee maker have a small counter top "foot print", that is the area actually displaced by the coffee maker on a counter top primarily because an increasing number of dwelling units are designed for single person households and because coffee makers must compete for counter space with appliances whose number and variety have both increased in recent years.

Because the present invention is designed for both travel and fixed base use and because the travel market requires certain additional qualities not necessary in the fixed base version, the travel version must be engineered to endure the rigors of travel. Specifically, the coffee maker should be crush resistant, drop resistant and scratch resistant.

Kit 10 is also designed for ease of operation. Thus, kit 10 should be easy to load for the brewing cycle, easy to pour and keep warm during the drinking cycle, and easy to wash and prepare for travel or storage.

Further still, kit 10 can be designed operate on either 110 or 220 volt electrical systems and, with the aporopriate adapters known to the art, kit 10 can be used in automobiles, boats and other vehicles.

Figure 3:
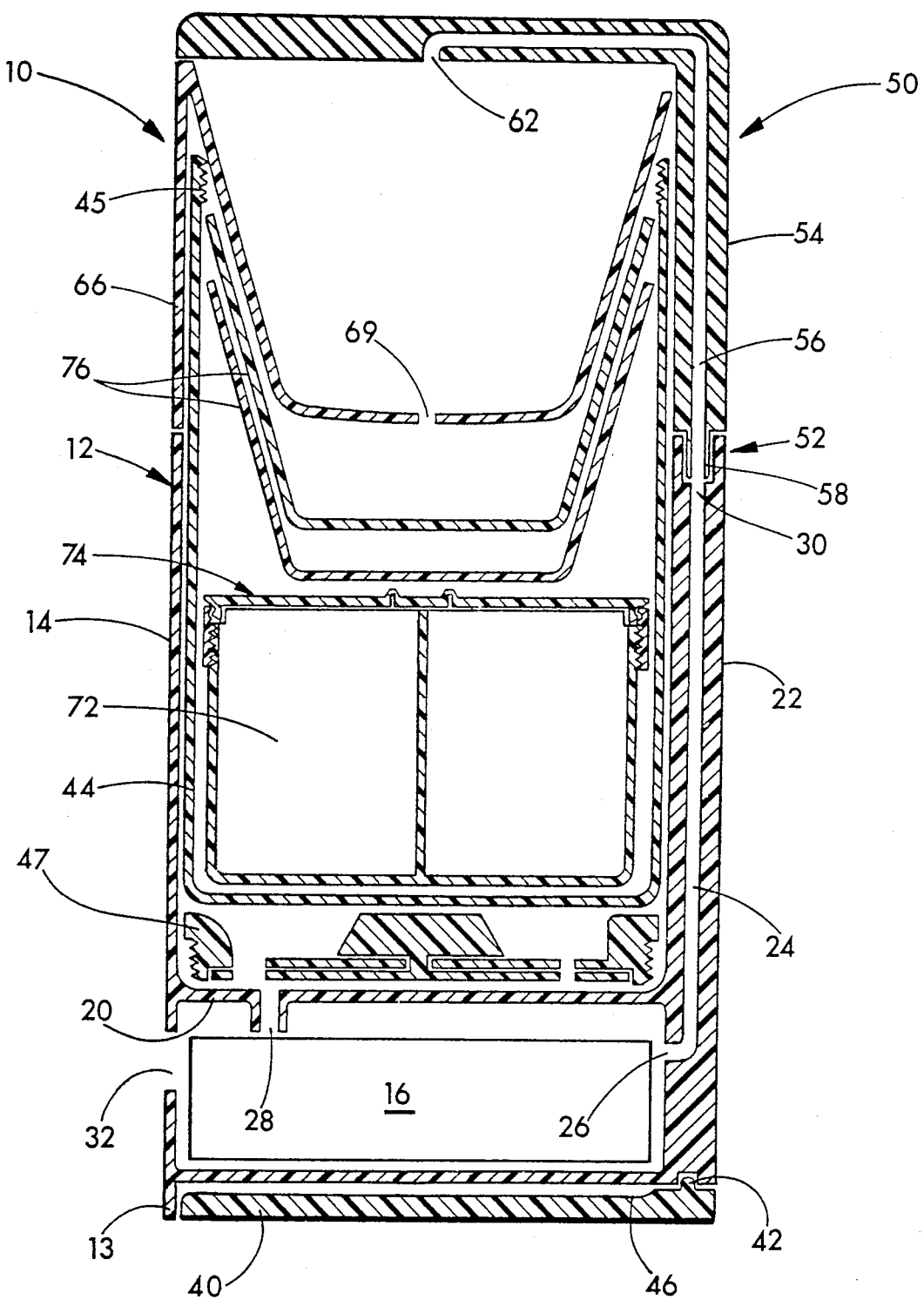
FIG. 3 is a cross-sectional view of the coffee maker kit of the present invention in the fully closed position.

Referring now specifically to the FIGURES, the numeral 10 generally designates the drip filter coffee making kit of the present invention. Kit 10 is provided with a base unit 12 having an exterior wall 14. Base unit 12 is an open ended container consisting essentially of a water heater unit located at 16 and a water reservoir portion located at 18. In the storage or travel mode, as best illustrated in FIG. 3, the other components making up kit 10 are nestled within the water reservoir portion 18 of base unit 12. These components, i.e., beverage holder or carafe 44, carafe lid 47, beverage mix storage container 72 and drinking cups 76 will be further described elsewhere in this disclosure.

Water heater unit 16 may be designed to operate either on a conventional house current, such as 110 or 120 volts, or it may be designed to operate from 12 or 24 volt power sources for use on boats, automobiles or in campers or the like. An electrical resistance heating element coil in unit 16 (not shown) underlies partition 20. The heating element is preferably of a known kind in which a measured quantity of cold water is admitted from the water reservoir into a heating chamber, is heated in the chamber, is expelled into a tube leading to the filter basket and which, with the aid of a thermostat, is automatically shut off after all of the water has been heated and expelled.

Laboratory research has established that brewing water should fall within 200° to 204° F. at the point when it comes in contact with coffee grounds. Therefore, one additional object of the present invention is to provide a coffee maker which is capable of heating water to this ideal temperature range and keeping the water at that temperature range during the brewing cycle.

Although not being restricted to any particular shape, base unit 12 is desirably cylindrical in configuration with a small bulge at one location 22 of wall 14 for purposes of containing hot water supply tube or conduit 24. It is well within the scope of this invention to provide a coffee making kit having a square, rectangular, triangular, oval or eliptical shape and variations and combinations thereof.

Partition 20 is provided with an opening 28 which allows water in the water reservoir portion 18 to flow to water heater unit 16. In operation, the water flowing through a tube in water heater unit 16 will be heated and thereby expand through inlet 26 and up conduit 24 to outlet 30. A detailed disclosure of the operation of the brewing cycle is presented further on in this disclosure.

Water heater unit 16 additionally contains a recessed opening 32 having an attachment means to accommodate power cord 36. Preferably, power cord 36 is detachable from kit 10.

The exterior wall 14 of base unit 12 may also be provided with instrumentation 38 which indicates the stage of operation, i.e., "brewing", "brewing complete", etc. It is within the scope of the present invention to connect the brewing stage instrumentation to lights, generally in the form of a red light which would be activated during the "coffee brewing" stage and a green light which would be activated during the "coffee ready" stage. The red light or "coffee brewing" indicator would automatically activate when power cord 36 is connected to kit 10 and would remain activated until the brewing process is completed. At that point, the green light or "coffee ready" indicator would be activated. Other forms of indicators include synthesized voice technology, rocker switches and musical melodies.

Water reservoir portion 18 occupies approximately the top three quarters of base unit 12. Optionally, the interior wall of base unit 12 is provided with graduated markings showing units of measure.

Figure 4:
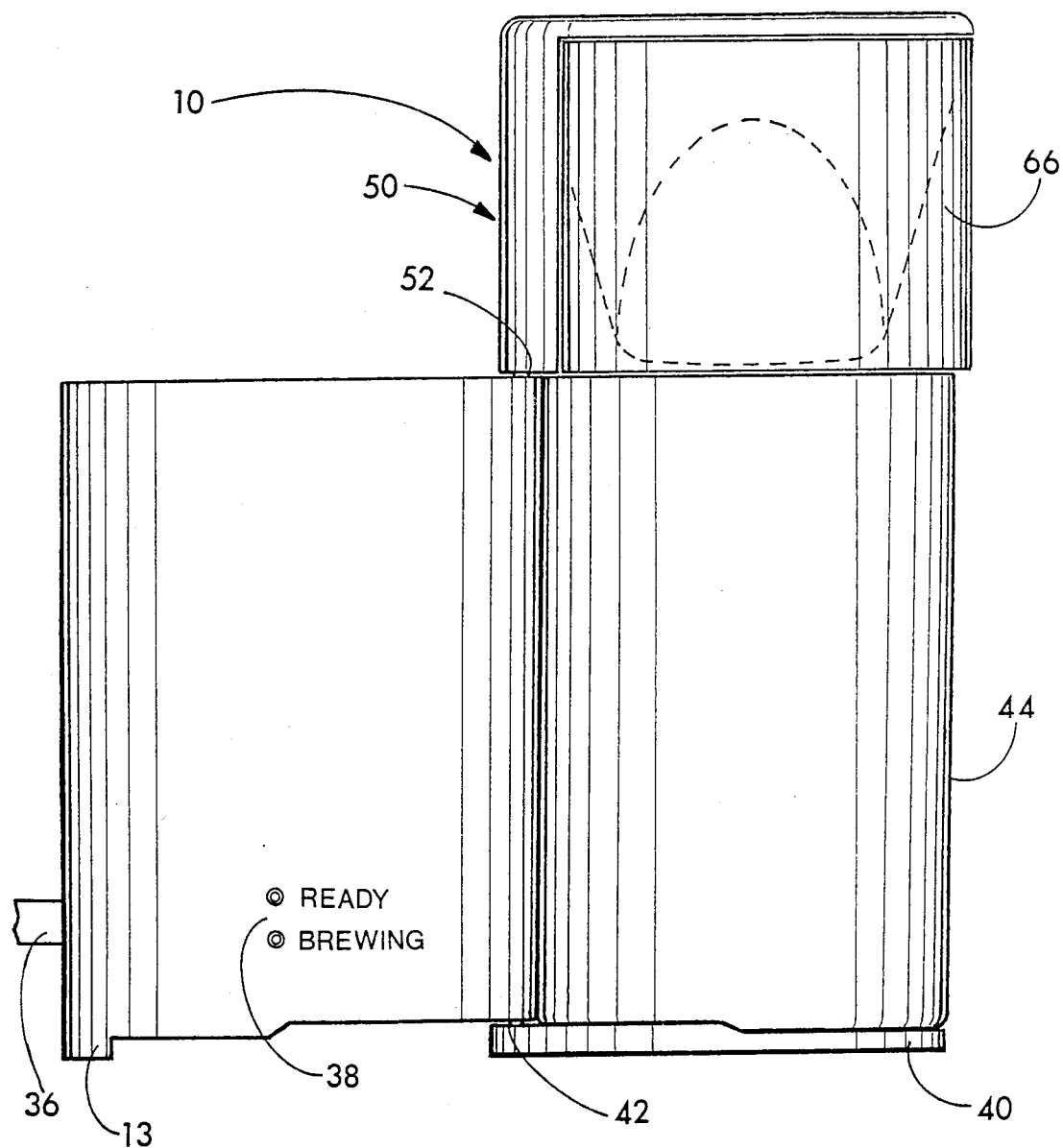
FIG. 4 is a front view of the coffee maker kit of the present invention in its operating or brewing position.
Figure 5:
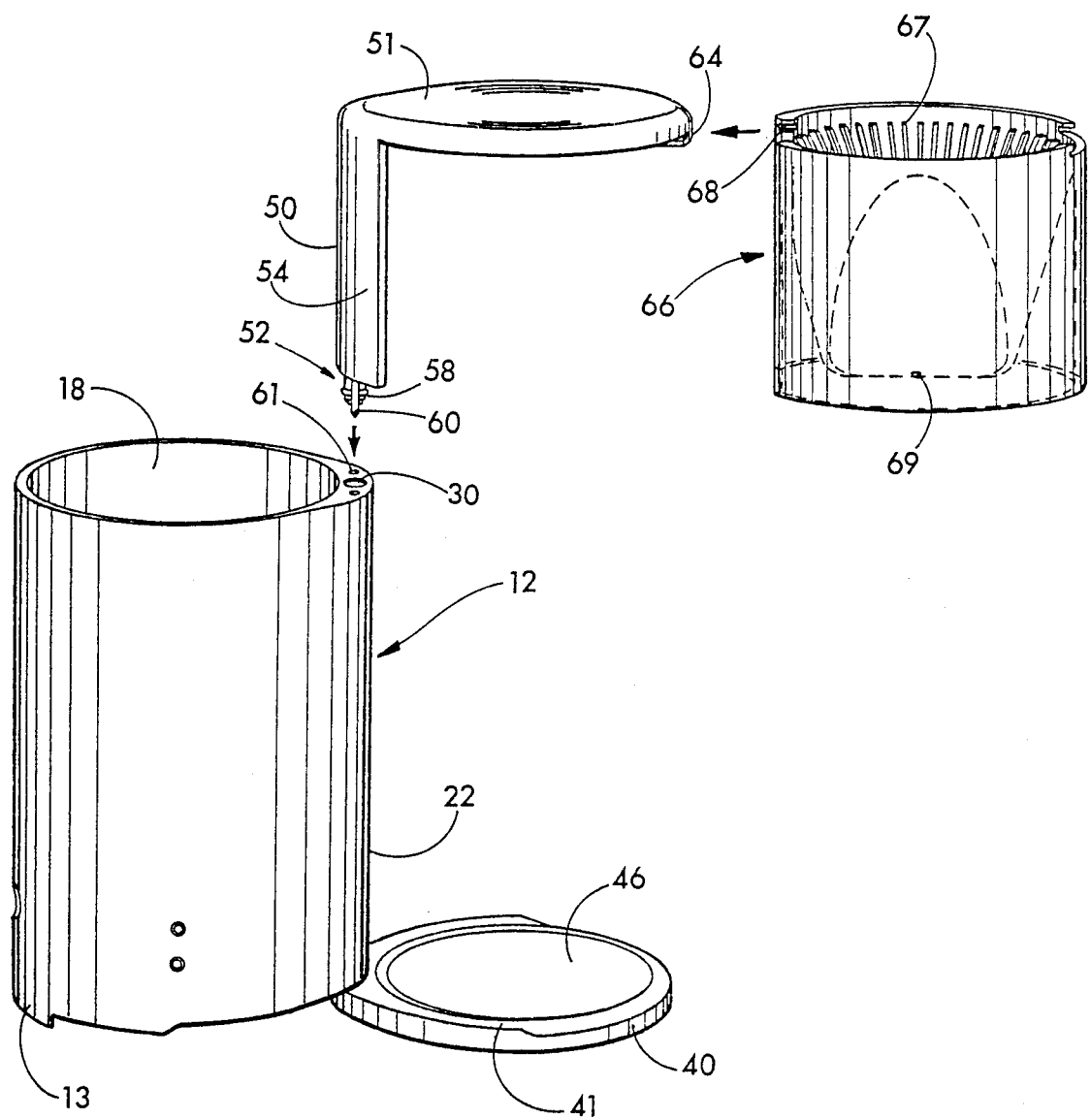
FIG. 5 is a partially exploded perspective view of the coffee making kit of the present invention.

Situated beneath and attached to base unit 12 is coaster 40. Coaster 40 is pivotally attached to base unit 12 at attachment pin 42. Pivotal attachment pin 42 enables coaster 40 to swivel out from beneath base unit 12 in order to become a platform for beverage holder or carafe 44. Coaster 40 can pivot on pin 42 to a position 180° from the storage mode as illustrated in FIGS. 4 and 5. To assure precise positioning of coaster 40 in both the storage and brewing position, coaster 40 is equipped with a cam and base unit 12 with a cam track (not shown). The design of the cam and cam track is such that, although coaster 40 could swivel 360°, the cam in coaster 40 would drop into one of two recesses (not shown) in the base unit cam track. The first recess is for the storage or travel mode and the second recess is for the brewing mode. The coaster 40 is adapted to "lock" into one of two positions. Base unit 12 is also provided with foot 13 in order to maintain its proper level position with respect to coaster 40.

Preferably, the surface 46 of coaster 40 is recessed with a partial lip 41 about 1/16 of an inch so that carafe 44 can rest inside recessed surface 46 and thus be perfectly positioned for coffee brewing, while still allowing carafe 44 to be removed without necessitating removal of filter basket 66.

Aside from serving as a carafe holder, coaster 40 also serves an important neatness function. For example, if carafe 44 was inadvertently removed prior to completed brewing, the presence of coaster 40 would prevent dripping coffee from falling onto the counter top.

The manner in which coaster 40 switches from storage to brew mode may vary for other shapes. For example, for a square or rectangular shape, the coaster might slide out on a simple track. Coaster 40 may also be provided with an electrical activating switch known to the art which prevents kit 10 from operating unless coaster 40 is in its brewing position as shown in FIGS. 4 and 5 with carafe 40 placed thereon as shown in FIG. 4.

To prevent base unit 12 and coaster 40 from slipping on counter surfaces, unit 13 and the bottom of coaster 40 could be provided with a non-slip material, such as plastic or rubber.

Base unit 12 also can be provided with a ventilation system for water heater unit 16. During the brewing cycle, water heater unit 16 generates considerable heat. In order to dissipate this heat, ventilation ducts (not shown) can be provided to allow for the dissipation of heat.

Figure 1:
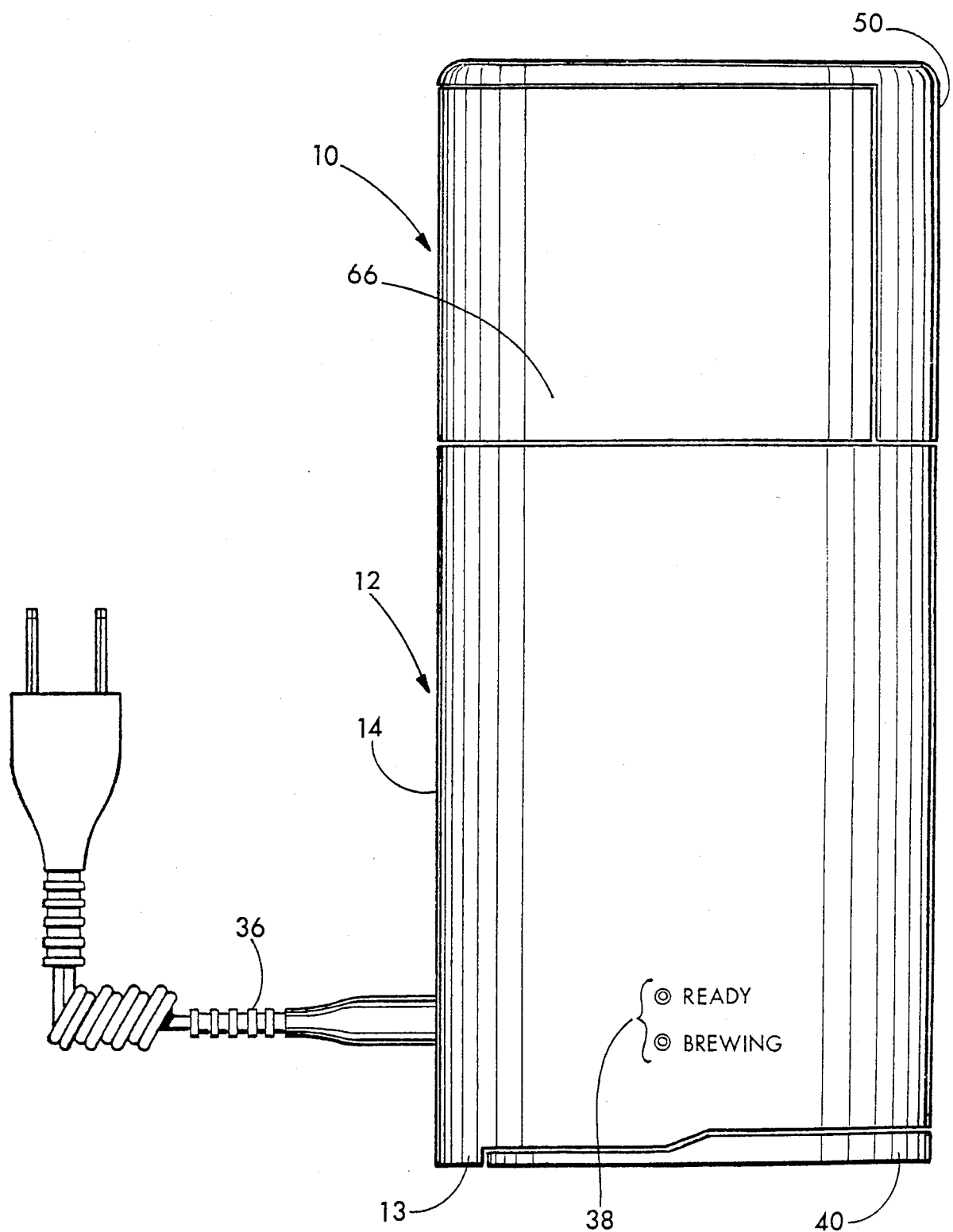
FIG. 1 is a front view of the coffee maker kit of the instant invention in a fully closed position.
Figure 2:
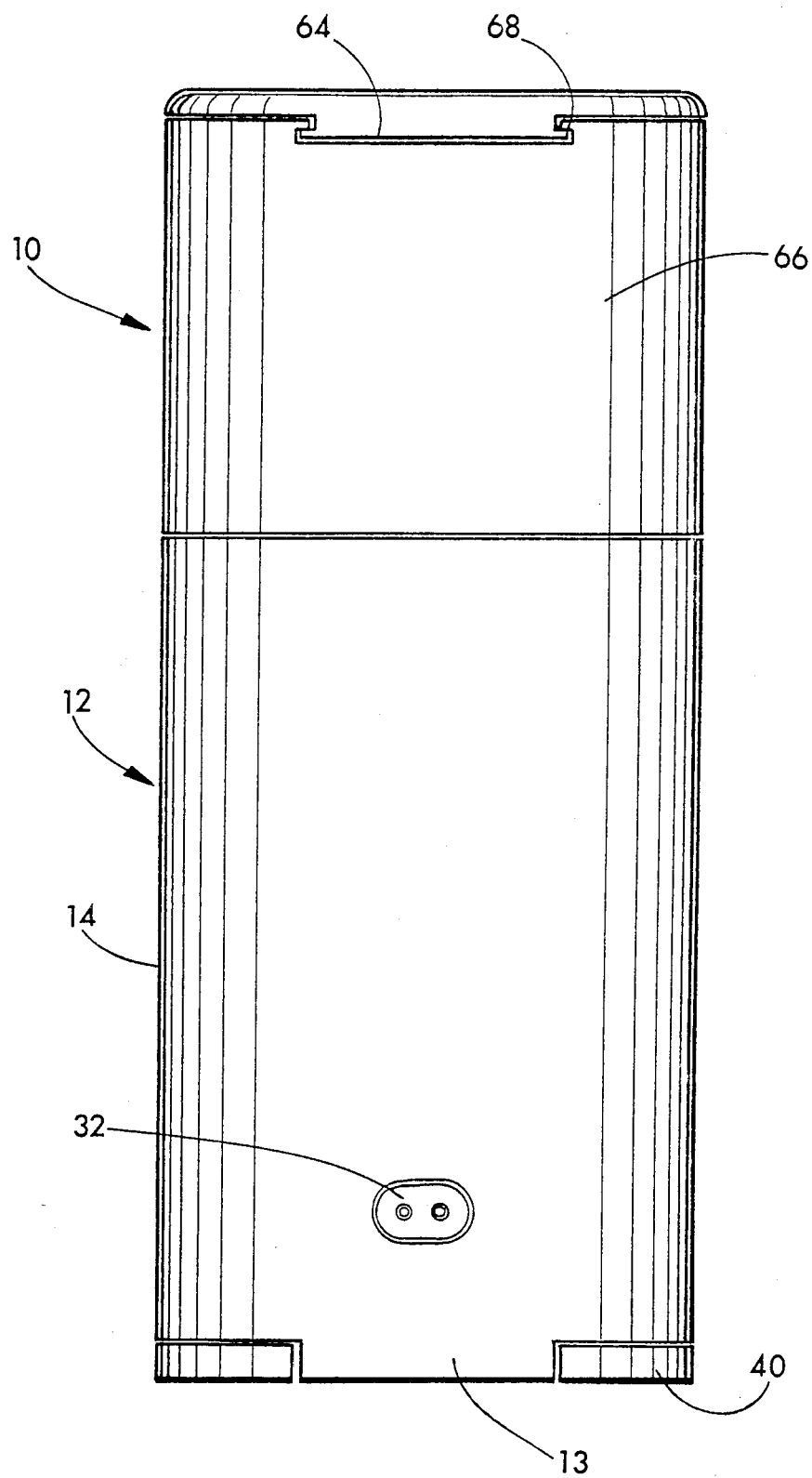
FIG. 2 is a side view of the coffee maker kit of the present invention in the fully closed position.
Figure 7:
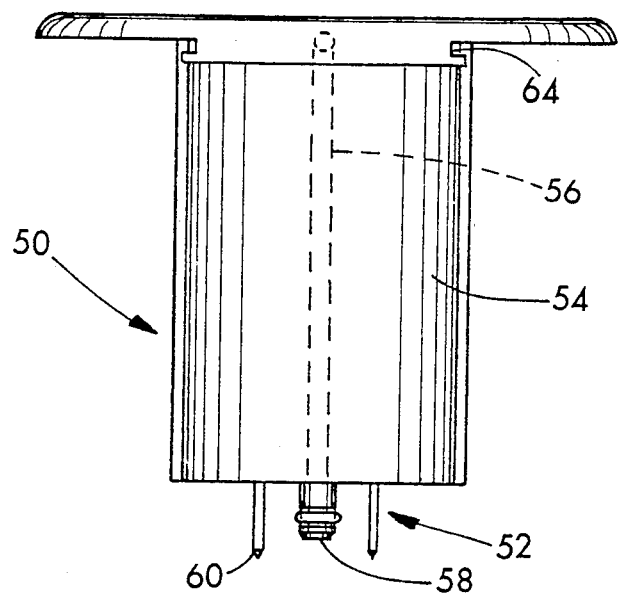
FIGS. 6 and 7 are side and front views respectively of the filter basket holder of the present invention.
Figure 6:
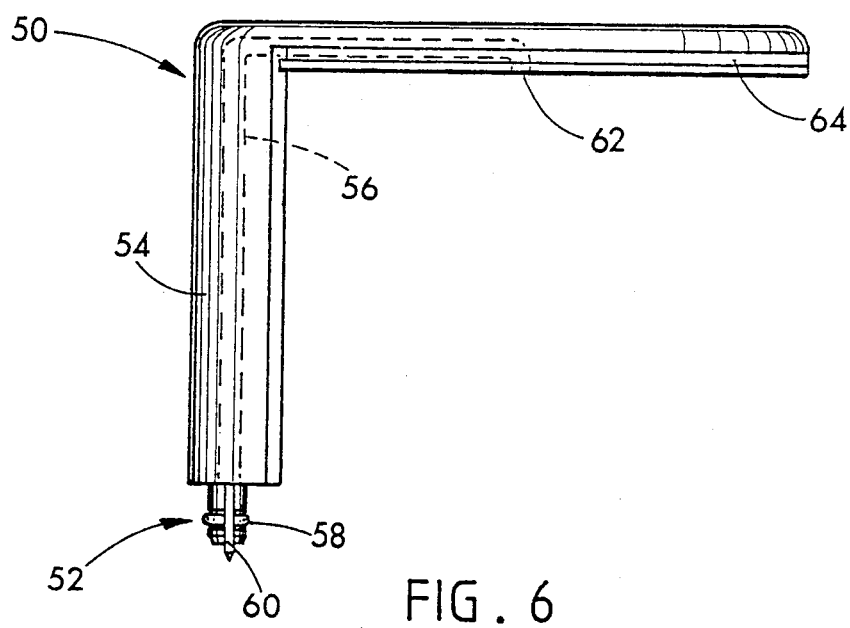

Situated adjacent to and on top of base unit 12 in a streamline manner is filter basket holder 50. In the travel or storage mode, filter basket holder 50 maintains the same profile as base unit 12 as illustrated in FIGS. 1–3. Filter basket holder 50 is provided with attachment means 52, best illustrated in FIGS. 3 and 5–7, which allows filter basket holder 50 to attach to base unit 12 in the closed, i.e., travel mode, as illustrated in FIGS. 1–3 or in the open, i.e., brewing mode, as illustrated in FIG. 4. Vertical support 54 is provided with a filter basket conduit 56, as illustrated in FIGS. 3 and 6–7, which communicates with conduit 24 at base unit conduit outlet 30. Preferably, conduit 56 is provided with extension 58 which nestles neatly in outlet 30, thus providing the dual feature of a continuous conduit and a filter basket attachment means. Filter basket holder 50 may also be supplemented with pins 60 or other attachment means on either side of extension 58 to be inserted in appropriate receiving holes 61 in the upper end of base unit 12. It is within the scope of the present invention to switch attachment 52 comprising extension 58 and pins 60 such that they extend from base unit 12 into receiving holes in filter basket holder 50.

It is also within the scope of this invention to provide an electrical circuit between filter basket holder 50 and base unit 12 which would prevent water heater unit 16 from being activated unless the filter basket holder 50 is properly positioned on base unit 12. This would prevent hot water from spewing out opening 30.

Conduit 56 is provided with at least one outlet 62 allowing for the vertical and downward dispersion of heated water from the top of filter basket holder 50.

In operation, filter basket holder 50 is rotated 180° from its storage or travel position allowing filter basket holder 50 to be cantilevered out over carafe 44 which is then positioned on coaster 40.

Filter basket holder 50 is also provided with an attachment means such as a track system 64 to allow easy and precise positioning of filter basket 66. The top surface of filter basket holder 50 can be provided with ventilator ducts 51 to allow steam to escape at the point where hot water is discharged from outlet 62.

Filter basket 66 is preferably designed to incorporate the well-known modified cone-shaped concept, shown in dotted lines in FIGS. 4 and 5. Filter basket 66 is designed to use either a disposable "cup-cake" shaped or cone-shaped paper filter such as, for example, of the Melitta (registered trademark) variety, or permanent metal or plastic filters such as stainless steel, gold and nylon. In the preferred mode, the interior walls of filter basket 66 include ribs 67 to allow the filter to breathe during the brewing process. At least one opening 69 is provided in filter basket 66 to permit the newly brewed coffee to drain into carafe 44. Filter basket track 68 at the top of filter basket 66 is designed to slip into the corresponding track 64 of filter basket holder 50. It is within the scope of the invention to provide other means to fit filter basket 66 to filter basket holder 50 such as, for example a snap fit mechanism.

Illustrated in FIG. 3 are all of the components of kit 10 internested within base unit 12 and filter basket holder 50. Immediately adjacent and interior to base unit 12 is carafe 44, mentioned prevously, which is similar in shape and slightly smaller in diameter than the interior dimensions of base unit 12. Thus, carafe 44 will fit easily within base unit 12. Carafe 44 is preferably designed with an insulated wall to keep coffee hot without the need for an additional heat source. Although not preferred, a heat source, such as an electric heating element could be provided in coaster 40 in order to continuously heat carafe 44 after the coffee has been brewed. Lip 45 of carafe 44 is designed to accept carafe lid 47 in a normal manner, such as by threads, as illustrated, or by hinges or snap-fit design (not shown). In the travel mode, carafe lid 47 is situated between carafe 44 and partition 20.

Carafe lid 47 is best illustrated in FIGS. 9–11 and is designed to take up very little space. Carafe lid 47 is preferably provided with a dripless spout 49 and has maximum heat retention qualities. To prevent spilling during pouring, lid 47 is preferably threaded as shown so that it can be tightly secured to the carafe. In order to pour, knob 53 of lid 47 is turned to a "pour" mode, as illustrated in FIG. 10, thus opening carafe spout 49 and a small vent hole 55 as well. To close, knob 53 of carafe lid 47 is simply rotated in the opposite direction, as illustrated in FIG. 11, thus sealing off spout 49 and vent hole 55.

Positioned in the interior of carafe 44, in the travel mode, is beverage mix storage container 72. As illustrated in FIG. 8, beverage mix storage container 72 is preferably designed to contain enough beverage mix, i.e., coffee, for three-to-five full capacity servings of coffee. However, this can be adjusted as needed. Container 72 is preferably divided into equal sized compartments or cells 73. Each of the cells 73 provides enough coffee storage space to make one full pot of coffee. It is of course within the scope of the present invention to utilize cells 73 for the storage of tea, hot chocolate and other beverages depending upon the needs of the user. Container lid 74 attaches to container 72 in a conventional manner such as by threads or snap-fit design. However, it is preferred that the lid be provided with at lease one compartment opening 75 which will align with an individual cell 73 in container 72 so that the coffee from an individual cell may be removed from storage container 72 without the necessity of removing container lid 74, thus exposing the other cells to spilling.

Another embodiment (not shown) to the beverage mix storage container 72 is a container designed without cells. In this design a conventional coffee measure could be provided to allow the user to measure out varying amounts of coffee into filter basket 66. Lid 75 could be designed with or without a pouring spout.

Positioned within carafe 44 and above container 72 are internested drinking cups 76. Although two are shown in FIG. 3, it is within the scope of the invention to have more or fewer drinking cups depending upon the size and purpose of the kit 10. In the preferred embodiment the cups would be insulated.

It is also a part of the present invention to provide a travel and storage case (not shown) for kit 10. The travel case would be a relatively tight fitting sleeve with a special compartment for the storage of power cord 36. Additionally, the travel case would provide pockets for bags of supplies such as, for example, filters, powdered cream, sugar and stirring sticks. Alternatively, individual packets of sugar and powder cream and the filters could be stored inside the cone of filter basket 66. The travel case is preferably made of a soft flexible, wear-resistant material such as plastic, leather or cloth.

Thus the present invention provides a drip coffee maker which nestles together in an extremely compact form for storage or travel. In order to convert kit 10 from the storage mode to the brewing mode, the kit is removed from the case and placed on a flat surface. Then, filter basket holder 50, filter basket 66, carafe 44 and carafe lid 47, cups 76 and coffee container 72 are all removed from base unit 12. The water reservoir portion 18 of base unit 12 is then filled to an appropriate level with water. Coaster 40 is then shifted into the brewing position and carafe 44 is placed thereon underneath the filter basket assembly. Filter basket 66 is then removed from filter basket holder 50 by means of track system 64, 68. A filter is then inserted into filter basket 66 and coffee is loaded from one of the cells of container 72. Filter basket 66 is then returned to filter basket holder 50 by means of track system 64, 68 and the filter basket assembly, including filter basket holder 50 and the loaded filter basket 66 is placed in the brewing or cantilevered position over carafe 44 and held in place by extension 58 and other attachment means as necessary. Power cord 36 is then attached to kit 10 and to an electrical outlet. The water in water reservoir portion 18 flows at a measured pace through opening 26 into water heater unit 16 where it is heated and, due to the expansion of the heated water, forced through opening 28 up conduits 24 and 56 and out filter basket holder outlet 62 onto the coffee grounds which have been placed in filter basket 66. The velocity of the water reaching outlet 62 can be adjusted as a function of the size of opening 28, the diameters of conduits 24, 56 and the power and design of water heater unit 16. The heated water is then allowed to percolate through the coffee grounds and through filter basket opening 67 and into insulated carafe 44.

An important feature of the present invention is to design the coffee maker so that certain critically important aromatic oils are not allowed to escape into the air during the brewing process. Research has shown that certain components in coffee are responsible for both the coffee aroma and the coffee taste. In order to prevent these aromatic components from escaping into the atmosphere during the brewing process, kit 10 is designed so that the spatial relationship between carafe 44 and filter basket 66 is relatively snug during the brewing process. This snug-fit relationship traps the aromatic oils in the carafe 44 thus yielding optimum coffee flaver.

After the brewing cycle is complete, carafe 44 is removed and carafe lid 47 affixed thereto. The filter basket assembly 50, 66 is removed from base unit 12, rotated 180 degrees and reinserted into base unit 12 in the storage position. Carafe lid 47 is affixed to carafe 44 which is then ready to pour. Hot coffee may be appropriately stored in the insulated carafe/carafe lid assembly for future use.

Although this invention has been described in conjunction with specific embodiments, it is evident that many alternatives and variations will be apparent to those skilled in the art in the light of the foregoing description. For example, the coffee making kit of the present invention could just as well be suitable for a full-sized, i.e., 8, 12 or larger cup, coffee making kit. Accordingly, the invention is intended to embrace all of the alternatives and variations that fall within the spirit and scope of the appended claims.

What is claimed is:

1. A self-contained hot beverage or drip coffee maker comprising:
   (a) a base unit including an open top end, a closed bottom end, an interior including an interior side wall and an interior bottom wall, and an exterior wall,
      wherein said interior is adapted to receive water for heating,
      said closed bottom end containing means for heating water,
      said base unit further including a first conduit located between said interior side wall and said exterior wall for directing heated water toward an outlet in said open top end of said base unit;
   (b) a hot beverage holder removably internested in the interior of said base unit and adjacent said interior side wall of said base unit,
      said beverage holder having an interior portion being adapted to receive said hot beverage;
   (c) a beverage mix storage container for holding dried beverage mix, said container being removably internested in said interior of said hot beverage holder; and
   (d) a beverage filter basket assembly including a filter basket having an open top portion and being positioned in a storage position adjacent said top portion of said base unit, said filter basket having an exterior wall which, is of the same shape as the exterior side wall of the base unit and is aligned with the exterior side wall of the base unit when the filter basket is in said storage position such that the exterior walls of the filter basket and the base unit together comprise a contiguous outer surface of the hot beverage or drip coffee maker,
      said beverage filter basket further including means for receiving a beverage filter and a filter basket holder which is removably positioned on said base unit adjacent said top portion of said filter basket, said filter basket holder supporting the filter basket and including an interior wall and an exterior wall, said filter basket holder further including a second conduit having an inlet communicating with said first conduit for directing heated water to said open end of said beverage filter basket.

2. The hot beverage or drip coffee maker according to claim 1 wherein said base unit includes indicating means for indicating a condition of the heated water.

3. The hot beverage or drip coffee maker according to claim 1 wherein said means for heating water includes means for connecting the heating means to an electrical outlet.

4. The hot beverage or drip coffee maker according to claim 1 wherein said means for heating water includes means for connecting the heating means to the electrical system of a vehicle.

5. A hot beverage or drip coffee maker according to claim 1 further comprising at least one beveraqe drinking cup removably internested in said hot beverage holder adjacent said beverage storage container.

6. The hot beverage or drip coffee maker according to claim 5 comprising two internested drinking cups.

7. A hot beverage or drip coffee maker according to claim 1 further comprising a coaster integrally aligned to said bottom end of said base unit, said coaster including means for moving away from said bottom end of said base unit, thus forming a position of alignment for said hot beverage holder when said portable hot beverage or drip coffee maker is in operating position.

8. The hot beverage or drip coffee maker according to claim 7 wherein said coaster has a partially recessed surface to hold said hot beverage holder.

9. The hot beverage or drip coffee maker according to claim 7 wherein said coaster is pivotally attached to said base unit, said coaster being adapted to pivot to a brewing or storage position, said coaster being further provided with means to lockingly engage said coaster in said brewing or said storage position.

10. The hot beverage or drip coffee maker according to claim 7 wherein said coaster moves away from said bottom unit by means of a track system.

11. The hot beverage or drip coffee maker according to claim 1 wherein said hot beverage holder is insulated to retain heat.

12. The hot beverage or drip coffee maker according to claim 1 further comprising a hot beverage holder lid removably positioned in said portable hot beverage or drip coffee maker between said bottom interior wall of said base unit and said bottom exterior wall of said beverage holder and adapted to be releasably connected to said top portion of said hot beverage holder.

13. The hot beverage or drip coffee maker according to claim 12 wherein said hot beverage holder lid includes a dripless spout.

14. The hot beverage or drip coffee maker according to claim 13 wherein said lid includes a knob which is twisted to access said dripless spout.

15. The hot beverage or drip coffee maker according to claim 1 wherein said beverage storage container including dividing means for dividing the container into sections, each said section being adapted to hold a pre-measured amount of said beverage mix.

16. The hot beverage or drip coffee maker according to claim 15 wherein said beverage storage container includes a removable lid, said lid containing a sealable opening adapted to allow removal of beverage mix from one said section at a time.

17. The hot beverage or drip coffee maker according to claim 1 wherein said filter basket holder is cantilevered to one side of said base portion in the brew position.

18. The hot beverage or drip coffee maker according to claim 1 further comprising means attaching said filter basket holder to said base unit, said means comprising an extension to said inlet of said second conduit, said extension being adapted for positioning in said outlet of said first conduit.

19. The hot beverage and drip coffee maker according to claim 18 wherein said means attaching said filter basket holder to said base unit further comprises at least one pin situated on either side of said conduit extension.

20. The hot beverage and drip coffee maker according to claim 19 wherein said means supplying hot water to said filter basket includes means directing heated water vertically with respect to said walls of said bottom unit and said filter basket holder and horizontally over said beverage mix.

21. The hot beverage and drip coffee maker according to claim 1 further comprising means to engage said filter basket to said filter basket holder, said means forming a snug fit between said filter basket and said filter basket holder.

22. The hot beverage and drip coffee maker according to claim 21 further comprising means allowing steam to escape said filter holder where said hot water is discharged on the beverage mix.

23. The hot beverage and drip coffee maker according to claim 1 wherein said filter basket is substantially cone-shaped in order to concentrate water as it flows through said beverage mix.

24. The hot beverage and drip coffee maker according to claim 23 wherein said filter basket is configured to fit disposable or permanent filters.

25. The portable hot beverage and drip coffee maker according to claim 23 wherein said filter basket comprises ribbed interior walls.

26. The portable hot beverage and drip coffee maker according to claim 1 further comprising means preventing the activation of said means for heating water when said base unit and said filter basket assembly are improperly positioned positioned with respect to each other.

27. The portable hot beverage and drip coffee maker according to claim 7 further comprising means inhibiting said means for heating water when said coaster or said hot beverage holder is not in said position of alignment.

* * * * *